United States Patent

Assouline et al.

[15] 3,671,963
[45] June 20, 1972

[54] BLIND LANDING AIDS

[72] Inventors: George Assouline; Pierre Conjeaud; Pierre Girault; Eugène Leiba, all of Paris, France

[73] Assignee: Thomson-CSF

[22] Filed: Dec. 19, 1969

[21] Appl. No.: 886,481

[30] Foreign Application Priority Data

Jan. 3, 1969 France ........................... 6900025

[52] U.S. Cl. ................. 343/6 ND, 250/83.3 H, 340/27 NA, 343/5 LS
[51] Int. Cl. ........................................... G01s 9/62
[58] Field of Search ............. 343/17, 65 R, 5 LS; 340/27 NA; 250/83.3 H

[56] References Cited

UNITED STATES PATENTS

| 2,944,151 | 7/1960 | Whitney et al. | 343/101 X |
| 3,104,478 | 9/1963 | Strauss et al. | 343/6 ND X |
| 2,590,540 | 3/1952 | Jackson | 343/107 X |

*Primary Examiner*—Rodney D. Bennett, Jr.
*Assistant Examiner*—Richard E. Berger
*Attorney*—Kurt Kelman

[57] ABSTRACT

A blind landing aid system for visualizing on board an aircraft, a runway delimited by responder beacons wherein an infra-red transmitter, located on board the aircraft, emits an infra-red beam scanning the ground according to a television pattern, each responder beacon comprises an infra-red detector controlling a radioelectric transmitter transmitting a pulse when the detector receives the infra-red beam, and a receiver, located on board the aircraft receives the radioelectric pulses and controls the electron beam of a cathode-ray tube whose screen is scanned in synchronism with the scanning of the infra-red beam.

5 Claims, 3 Drawing Figures dimensions in FIG. 1 have been exaggerated for the sake of clarity. As to the runway P, it is marked by responder beacons 2 which, upon being scanned by the laser beam, emit a radio pulse.

BLIND LANDING AIDS

The present invention relates to blind landing aids. More particularly it relates to a system for providing to the pilot a visual display of the runway, even in fog.

As is known a pilot cannot attempt a landing when the visibility is below a certain minimum; in the case of airline operations, for example, this limit is 300 meters.

This limit corresponds to attenuation of visible light by mist or fog, in the order of 56 db/km. However, it has been established that infra-red radiation is much less attenuated by fog than is visible light. The attenuation is the less the longer the wavelength used.

It is an object of this invention to exploit this fact in order to provide to the pilot a visual display of the runway, which display is of the same kind as the view which the pilot would have in clear weather, this even in foggy conditions and at distances from the runway which are well in excess of the visibility threshold. This should make it possible to carry out landings even under atmospheric conditions where landing would otherwise normally be impossible and, moreover, should improve safety in situations where visibility is poor although not so poor as to prevent landing at all.

According to the invention there is provided a blind landing aid system for visualizing, on board an aircraft the landing runway said aircraft is approaching, said system comprising: transmitting means on board said aircraft for emitting an infra-red beam scanning the ground in front of said aircraft in accordance with a predetermined pattern; responder beacons bounding said runway for transmitting respective radioelectric pulses upon being swept by said infra-red beam; and receiving means, on board said aircraft, comprising a cathode-ray tube having a screen and means for scanning said screen in synchronism with the scanning performed by said infra-red beam, for receiving said pulses and for visualizing said beacons as luminous spots on said screen.

For a better understanding of the invention and to show how the same may be carried into effect, reference will be made to the drawings accompanying the ensuing description and in which.

Figure 1:
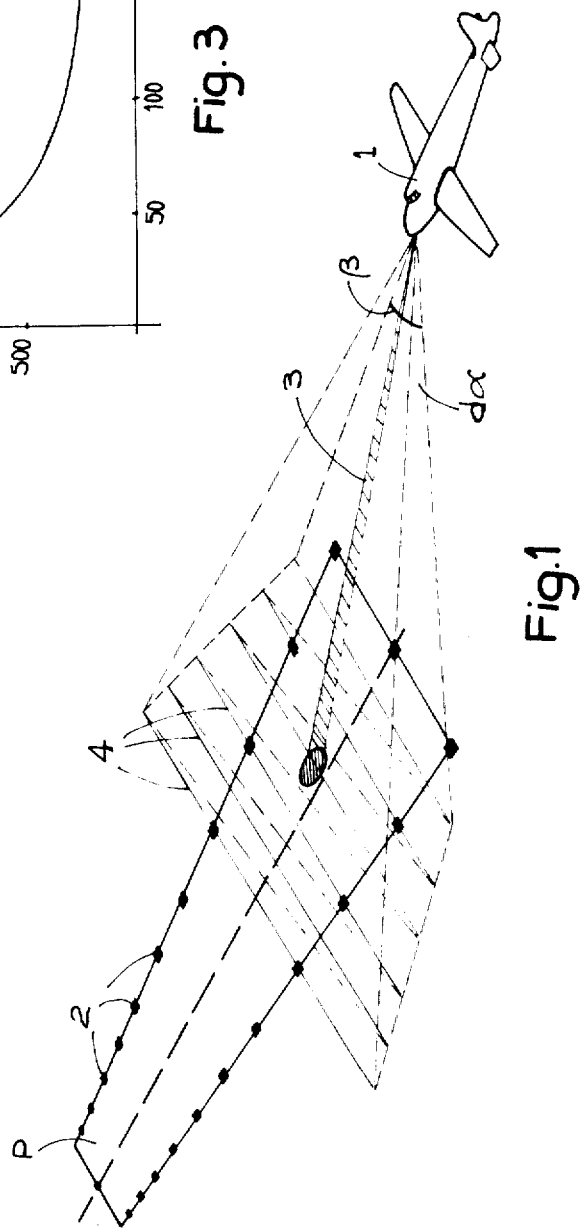
FIG. 1 is an explanatory diagram illustrating the principle of the invention.

In FIG. 1, an aircraft 1 has been illustrated, which is on final approach towards the runway P marked by the landing beacons 2. In order for the landing to be made, the pilot must be able to see a sufficient number of beacons 2 in order to determine the runway axis. The system in accordance with the invention provides for the transmission from the aircraft 1, of an infra-red laser beam 3 which scans in accordance with a television scanning pattern the ground in front of the aircraft, Certain dimensions in FIG. 1 have been exaggerated for the sake of clarity. As to the runway P, it is marked by responder beacons 2 which, upon being scanned by the laser beam, emit a radio pulse.

On board the aircraft there is provided a cathode-ray tube the spot of which scans the screen in synchronism with the scanning performed by the laser beam, the brightness of the spot being controlled by signals from a radio receiver which receives the pulses transmitted by the beacons 2. Thus, there are displayed upon the screen, in the form of luminous spots, the landing beacons which are located within the range of scan of the laser beam. An advantage of this system is that the range of infra-red radiation is much higher than that of visible radiation, so that the pilot can see on the screen the alignment of the landing beacons which define the edge of the runway even though they may be invisible to the naked eye.

Taking this into account, it goes without saying that the scanned ground portion should have sufficient dimensions to ensure that there are always a sufficient number of runway beacons visible on the screen, between the time at which the aircraft is at a maximum predetermined range and the time at which touchdown takes place. Actually, the pilot needs to see a sufficient number of runway beacons in order for him to be able to visualize the runway axis, and to appraise the distance of the aircraft from the runway, by estimate of the spacing of the beacons and of the perspective. The angular amplitude $\beta$ of the horizontal scan, the amplitude $d\alpha$ of the vertical scan, and the mean value of inclination $\alpha$ of the laser beam in relation to the horizontal direction, are thus chosen to accord with these requirements.

Figure 2:
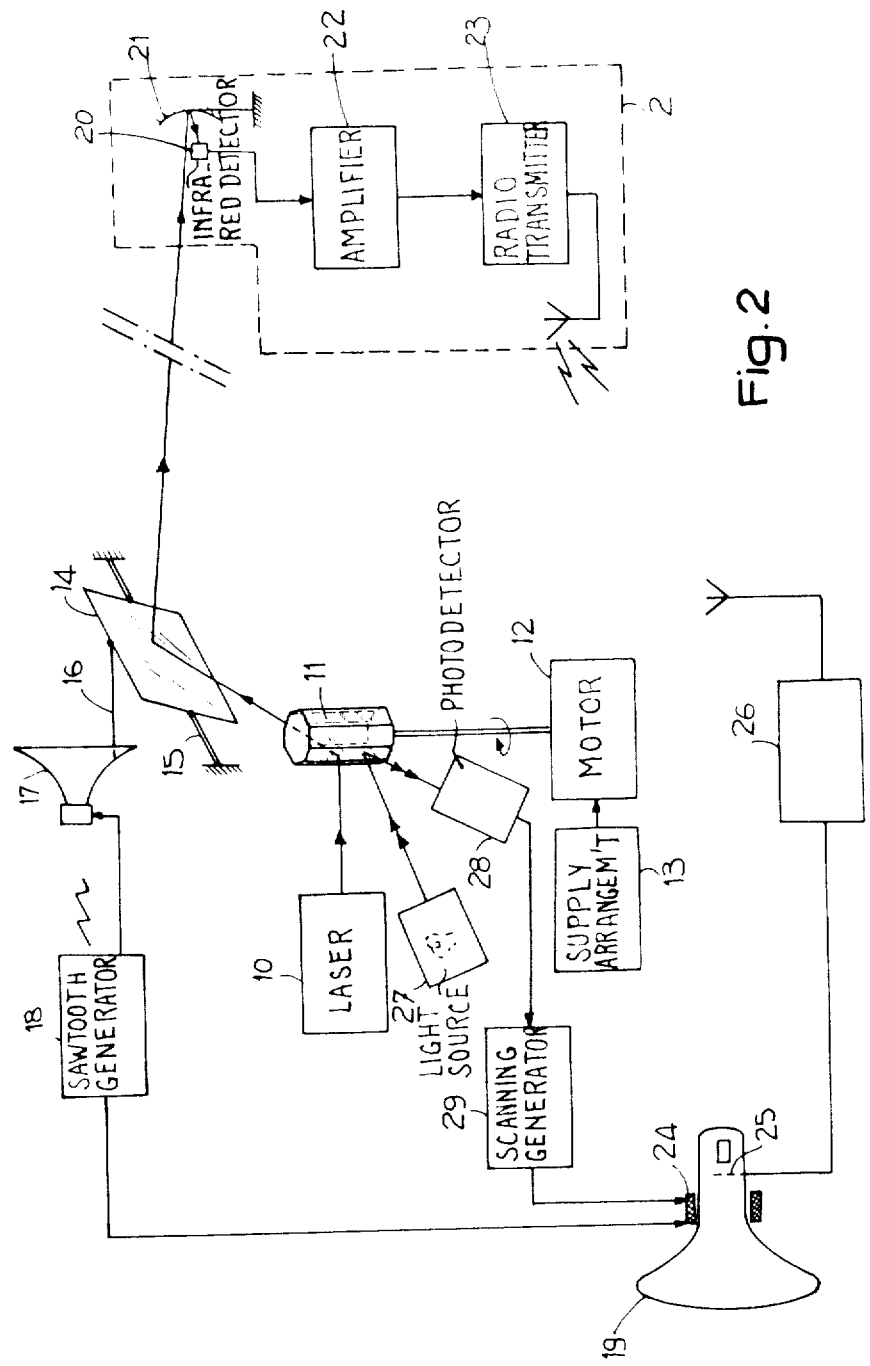
FIG. 2 illustrates a diagram of the system in accordance with the invention.

A diagram illustrating an embodiment of the system in accordance with the invention is shown in FIG. 2. Each runway beacon 2 comprises an infra-red detector 20 located at the focus of a spherical mirror 21, or a Cassegrain optical system. This detector can, for example, be a pyroelectric detector, this having the advantage that it requires no cooling while having a rather short response time, compatible with the requirements of the system in accordance with the invention. The signal produced by the detector 20, while it is swept by the laser beam, is amplified by an amplifier 22 and serves as a synchronizing pulse for a radio transmitter 23 which then produces a pulse of a predetermined frequency F.

On board the aircraft, there if provided a transceiver arrangement, comprising a laser 10 producing an infra-red beam. Horizontal scanning is imparted to the beam by a rotary prism 11 with $n$ mirror facets, the number $n$ being selected as a function of the desired angular amplitude of scan. The prism 11 is driven by a motor 12 controlled and stabilized in speed by a supply arrangement 13. The speed of the motor is fixed as a function of the desired horizontal scanning frequency, which is equal to the product of the motor speed, in revolutions per second, by the number $n$. The mirror 11 is located in such fashion as to give the laser beam a mean deflection of 90°. The beam is then reflected by a mirror 14 at 45° mounted on torsion bars 15. It is given a low-amplitude rotational movement about these bars, by the diaphragm of a loudspeaker 17, in order to produce a vertical scan movement in the laser beam. Of course, the movement of the mirror 14 can equally well be imparted to it by a cam arrangement or any other equivalent device.

An appropriate movement is imparted to the diaphragm of the loudspeaker by means of a sawtooth generator 18 operating at the desired vertical scanning frequency. The transceiver arrangement comprises, furthermore, a cathode-ray tube 19 the electron beam of which scans the screen in accordance with a television pattern in synchronism with the scanning performed by the laser beam. For this purpose, the vertical deflection coils are supplied with the sawtooth signals produced by the generator 18. The horizontal deflection coils are supplied by a scanning generator 29. The latter is synchronized by the pulses produced by a photo-detector 28 which picks up a light beam issuing from an auxiliary light source 27 and reflected by the rotary mirror 11.

The control electrode 25 of the tube 19 is supplied with the signals coming from a radio receiver 26 tuned to the frequency F. When the laser beam impinges upon a runway beacon the receiver 26 picks the pulse thus caused to be transmitted and thus causes a luminous spot to appear on the screen of the tube 19, which spot reproduces the position of the runway beacon concerned.

Figure 3:
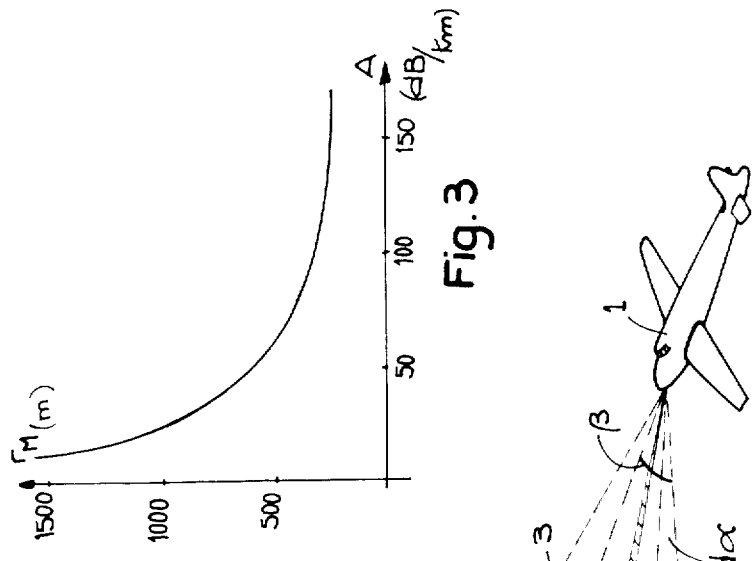
FIG. 3 is an explanatory graph.

By way of example, FIG. 3 illustrates the range variation $r_M$ of the system in accordance with the invention, as a function of the attenuation A in decibels per kilometer produced by fog at a wavelength of 10.6 microns, this being the wavelength at which the carbon dioxide laser operates. At this wavelength, atmospheric transmission is excellent.

It will be observed, from a consideration of this graph, that for an attenuation of 30 dB/km at a wavelength of 10 $\mu$, this corresponding to a visibility of less than 300 meters, the range of the system is in the order of 850 meters and this means that landing may be carried out under excellent safety conditions.

Of course other wave lengths may be used. In particular, a cyanide gas laser produces a wave-length of 337 $\mu$ at which atmospheric transmission is very much poorer, the attenuation by fog, however, being very slight indeed.

Of course, there can be associated with the laser transmitter of the device in accordance with the invention, any suitable arrangement for compensating for the drift and pitch angles of the aircraft.

Of course, the invention is in no way limited to the embodiment described which was given solely by way of example.

WHAT IS CLAIMED IS:

1. A blind landing aid system for visualizing, on board an aircraft the landing runway said aircraft is approaching, said system comprising: transmitting means on board said aircraft for emitting an infra-red beam scanning the ground in front of said aircraft in accordance with a predetermined pattern; responder beacons bounding said runway for transmitting respective radioelectric pulses upon being swept by said infra-red beam; and receiving means on board said aircraft comprising a cathode ray tube having a screen and means for scanning said screen in synchronism with the scanning performed by said infra-red beam for receiving said pulses and for visualizing said beacons as luminous spots on said screen.

2. A transmitting-receiving apparatus, for use in a system as claimed in claim 1, comprising: an infra-red source for emitting an infra-red beam; scanning means for the ground to be scanned by said beam, in front of said aircraft, in accordance with a predetermined pattern; a radioelectric receiver for receiving the radio-electric pulses from said beacons; a cathode-ray tube having a control electrode, connected to said receiver, and deflection means; and synchronizing means, coupled to said scanning means and to said deflection means for synchronizing the scanning of the screen of said cathode-ray tube and the scanning of the ground by said infra-red beam.

3. A transmitting-receiving apparatus, for use in a blind landing aid system capable of visualizing, on board an aircraft the landing runaway said aircraft is approaching, said apparatus comprising: an infra-red source for emitting an infra-red beam: scanning means for the ground to be scanned by said beam, in front of said aircraft, in accordance with a predetermined pattern; a radioelectric receiver for receiving the radio-electric pulses from beacons bounding said runway; a cathode-ray tube having a control electrode, connected to said receiver, and deflection means; and synchronizing means, coupled to said scanning means and to said deflection means for synchronizing the scanning of the screen of said cathode-ray tube and the scanning of the ground by said infra-red beam,; said scanning means comprising a first rotating prism having mirror facets and located for deviating said beam by a mean angle substantially equal to 90°; means for rotating said prism at a predetermined speed; a plane mirror located at an angle of substantially 45° from the mean direction of the beam reflected by said prism; means for mounting said plane mirror rotatably about an axis located in the plane of incidence of said infra-red beam on said prism; and oscillating means coupled to said plane mirror for oscillating said plane mirror about said axis.

4. An apparatus as claimed in claim 3, wherein said synchronizing means comprise an auxiliary light source for emitting a light beam towards said prism; and a photodetector located for detecting said light beam after reflection on said prism.

5. A responder beacon, for use in a system as claimed in claim 1, comprising: an infra-red detector; optical means for focusing any received infra-red beam substantially on said detector; and a radioelectric transmitter coupled to said detector for generating a radioelectric pulse of predetermined frequency upon said detector being swept by an infra-red beam.

* * * * *